US008275883B2

(12) United States Patent
Snoddy et al.

(10) Patent No.: US 8,275,883 B2
(45) Date of Patent: Sep. 25, 2012

(54) SYSTEMS AND METHODS FOR ACCESSING TELESCOPES

(75) Inventors: Jon Snoddy, Pasadena, CA (US); Glynn Burke, St. Johns (CA); Michael Rondell, St. Johns (CA); Michael Sullivan, St. Johns (CA)

(73) Assignee: My Telescope.com, St. Johns, NL (CA)

( * ) Notice: Subject to any disclaimer, the term of this patent is extended or adjusted under 35 U.S.C. 154(b) by 1020 days.

(21) Appl. No.: 10/267,919

(22) Filed: Oct. 8, 2002

(65) Prior Publication Data
US 2004/0068564 A1    Apr. 8, 2004

(51) Int. Cl.
*G06F 15/173* (2006.01)
(52) U.S. Cl. .......................... 709/225; 348/143
(58) Field of Classification Search ............... 705/5, 16, 705/18; 709/225–226; 348/143
See application file for complete search history.

(56) References Cited

U.S. PATENT DOCUMENTS

| 4,913,549 | A | | 4/1990 | Fujita et al. | |
|---|---|---|---|---|---|
| 5,729,471 | A | * | 3/1998 | Jain et al. | 725/131 |
| 5,826,122 | A | | 10/1998 | Shekel | |
| 5,930,501 | A | | 7/1999 | Neil | |
| 5,987,502 | A | * | 11/1999 | Banks et al. | 709/203 |
| 6,085,227 | A | * | 7/2000 | Edlund et al. | 709/203 |
| 6,104,911 | A | * | 8/2000 | Diekelman | 455/13.1 |
| 6,147,644 | A | * | 11/2000 | Castles et al. | 342/367 |
| 6,204,885 | B1 | | 3/2001 | Kwoh | |
| 6,369,942 | B1 | * | 4/2002 | Hedrick et al. | 359/430 |
| 6,775,251 | B1 | * | 8/2004 | Wiedeman et al. | 370/316 |
| 7,313,763 | B1 | * | 12/2007 | Bisque et al. | 715/736 |
| 2002/0010783 | A1 | * | 1/2002 | Primak et al. | 709/228 |
| 2007/0217000 | A1 | * | 9/2007 | Baun et al. | 359/399 |

FOREIGN PATENT DOCUMENTS

| CA | 2323391 | 4/2002 |
|---|---|---|
| EP | 0943992 | 9/1999 |
| WO | WO00/19695 | 4/2000 |

OTHER PUBLICATIONS

The MicroObservatory Users' Guide, http://mo-www.harvard.edu/MicroObservatory/UsersGuide/index.html, dated to Dec. 4, 2000 via Wayback machine at http://www.archive.org.*

(Continued)

*Primary Examiner* — Glenton B Burgess
*Assistant Examiner* — Oleg Survillo
(74) *Attorney, Agent, or Firm* — Steptoe & Johnson LLP

(57) ABSTRACT

A user obtains, views and stores image data of a selected celestial object from a network of available telescopes using a computer-generated user interface. Based on the selected object, information is accessed regarding each telescope from data sources such as databases and/or live data feeds to automatically select telescopes that are suitable for imaging the object, e.g., according to factors such as telescope type, power and configuration, location, weather conditions and altitude. The user may select a particular telescope and imaging time from a schedule of available telescopes and imaging times. At the scheduled time, an image is recorded of the celestial object and communicated to a central data store for access by the user, e.g., via a web site The user may be charged for the service based on factors such as exposure time, scheduling priority, type of telescope and the like.

8 Claims, 8 Drawing Sheets

OTHER PUBLICATIONS

ROBOsky.com Cost, http://www.robosky.com/pages/Registration/Cost.htm, dated to Dec. 26, 2001 via Wayback machine at http://www.archive.org.*

Nightly Scheduling of ESO's Very Large Telescope, Chavan et al., Astronomical Data Analysis Software and Systems VII ASP Conference Series, vol. 145, 1998.*

C.J. Mottram, Robonet Prototype—Architecture Design Document, Oct. 2001, pp. 1-11.*

Wampler, Software Requirements Specification, Gemini Software Design Team, Jun. 6, 1995.*

The MicroObservatory Users' Guide, http://mo-www.harvard.edu/MicroObservatory/UsersGuide/index.html, dated to May 8, 1999 via Wayback Machine at http://www.archive.org.*

Hoban et al., Virtual Telescopes in Education, May 2002, Journal of Digital Information, vol. 2, Issue 4, pp. 1-37.*

John Walker, "Earth and Moon Viewer"; http/www.fourmilab.ch/earthview/vplanet.html.

C.J. Mottram, "Robonet Prototype—Architecture Design Document"; Exeter University/Liverpool John Moores University.

BBC News; "Stargazers Watch via the Web"; SCI/TECH; pp. 1-3; May 3, 2002.

"Remote Access Astronomy Project Remotely Operated Telescope"; UC Santa Barbara; webmaster@www.deepspace.ucsb.edu, May 8, 2000.

TriValleyStargazers.org; "Welcome to Eyes-On-The-Skies.org a Robotic Solar Telescope"; Mar. 5, 2000.

"The eSTAR Project" http//www.astro.ex.ac.uk/estar/index.html; Jun. 10, 2002.

Susan Hoban, et al., "Virtual Telescopes in Education", Journal of Digital Information, vol. 2 Issue 4, Article No. 104, May 23, 2002.

C.J. Mottram, "Robonet Prototype—Architecture Design Document", Exeter University/Liverpool John Moores University, pp. 1, 8-11.

"The MicroObservatory Users' Guide", pp. 1-9, http:/;/web.archive.org/web/20020603010159/mo-www.harvard.edu/MicroObservatory/Users.

Mr. Mark J. Cox and Dr. John E.F. Baruch, "Robotic Telescopes: An Interactive Exhibit on the World-Wide Web", Department of Industrial Technology, University of Bradford, England, Mark Cox, m.j.cox@bradford.ac.uk.

* cited by examiner

WELCOME TO THE USER INTERFACE FOR MYTELESCOPE.COM

PROPOSED SCHEDULE

ACCEPT

TELESCOPE 1, 10:00 p.m.-10:05 p.m. Jan. 1, 2002 ☐

TELESCOPE 1, 2:00 a.m.-2:05 a.m. Jan. 2, 2002 ☐

TELESCOPE 2, 5:00 a.m.-5:05 a.m. Jan. 3, 2002 ☐

SUBMIT

FIG. 6

SYSTEMS AND METHODS FOR ACCESSING TELESCOPES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention provides systems and methods for accessing telescopes and, more particularly, to accessing a worldwide network of telescopes via a computer network such as the Internet.

Telescopes have become increasingly sophisticated since their development in the seventeenth century, and are an important tool for research, education and entertainment for both amateur and professional astronomers. Initially, telescopes allowed the user to observe the skies by simply looking into the eyepiece. In the 1930's, telescopic images were first captured on film. In the 1980's, electronic image capture was made possible by the advent of high quality charge-coupled device (CCD) cameras. Electronic image capturing coupled with remote control technology allowed the professional astronomer to operate a telescope in a more comfortable environment, such as a control room, where the images could be viewed on a CRT monitor. This notion of comfort was particularly important because telescope observatories are typically located in remote, high-altitude sites to minimize the thickness of atmosphere through which the light must travel to reach the telescope, and to avoid the negative effects of city lights.

During the 1990's, computer networks allowed the professional astronomer to control a telescope remotely and obtain image data from a remote location. The networks also allowed the astronomer to do work with many different observatories at the same time, using their in-depth knowledge and consulting with colleagues in the field to choose the most suitable observatory and telescope for each task. Typically, the professional astronomers, who were often associated with universities, had special access to the observatories and special knowledge of the availability and types of equipment.

The evolution of amateur astronomy has followed a similar path, but with some differences. The major difference is that the amateur's telescope is rarely mounted far from the observing site since maintaining a remote telescope site is expensive. Moreover, different settings, and even different telescopes are often required for observing various celestial objects. Again, the amateur typically does not have the resources of a well-equipped observatory.

Previous efforts have not provided a satisfactory solution. U.S. Pat. No. 6,085,227 to Edlund et al. "System and method for operating scientific instruments over wide area networks," discusses a system that includes client computers for interacting with users to accept commands and display results, a proxy server computer for performing intermediate processing of commands and results, and a device server computer coupled to the remote device that executes the commands and generates the results.

SUMMARY OF THE INVENTION

The present invention enables a user to obtain, view and store image data of a selected celestial object from a network of available telescopes using a computer-generated user interface. The invention assists astronomers, including amateur astronomers and other members of the general public, in selecting a telescope that is suitable for viewing a selected celestial object, and in scheduling use of the telescope and obtaining image data from the telescope. The invention also provides a database that is used to determine the availability of a telescope in the network.

In one aspect, a system for determining availability of telescopes to view a given celestial object includes a database having information from which can be determined the identity of any of the telescopes to suitably view a celestial object, and a time for doing so, and a computer programmed to access the database and identify any telescope that can suitably view a given celestial body and a time for doing so.

In another aspect, a method for providing access to telescopes includes receiving a user request via a computer network to view a specified celestial object, and using a data source having information relating to the telescopes and celestial objects to identify any telescope that can suitably view the specified celestial object.

In another aspect, a method for scheduling access to a telescope includes receiving a request from a computer-generated user interface to view a celestial object, determining, in response to the request, a proposed schedule indicating when a telescope is available to view the celestial object, informing a user of the proposed schedule via the user interface, and upon acceptance by the user of the proposed schedule, scheduling access to the telescope by the user according to the proposed schedule.

In another aspect, a method for providing access to telescopes includes selecting a celestial object of interest using a computer-generated user interface, communicating information identifying the selected celestial object to a remote data processing facility, accessing at the data processing facility a data source of information relating to the telescopes to select a telescope that can suitably view the selected celestial object, and communicating with the particular telescope to obtain an image of the selected celestial object.

In another aspect, a method for providing an on-line service for accessing telescopes includes receiving a user request to view a specified celestial object, responsive to the user request, selecting a particular telescope to use to obtain an image of the celestial object, and assessing a fee to the user for obtaining the image.

Corresponding systems are also presented.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 6 illustrates an example user interface of a proposed schedule for accessing one or more telescopes;

DETAILED DESCRIPTION OF PREFERRED EMBODIMENTS

Figure 1:
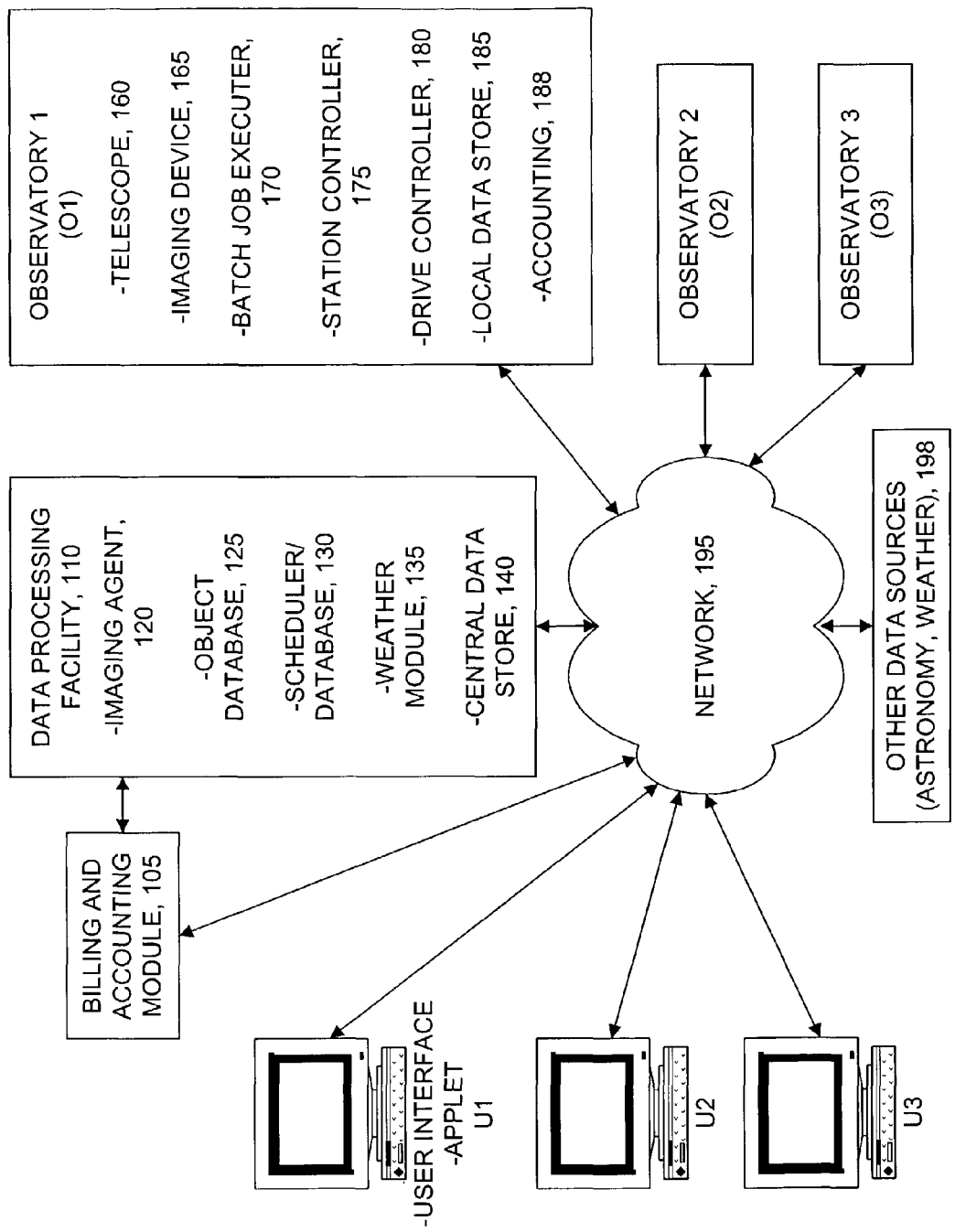
FIG. 1 illustrates a system for accessing telescopes.

FIG. 1 illustrates a system for accessing telescopes. The system may be configured in a variety of ways. In one approach, one or more user interfaces (U1, U2, U3), a data processing facility 110, and one or more observatories (O1, O2, O3) are provided which communicate via a network 195. A billing and accounting module 105, discussed further in connection with FIG. 8, may be associated with the data processing facility 110 for charging users for services they use and maintaining appropriate records, e.g., regarding the users' identities, billing information, and so forth. The network 195 may include any type of communication network regardless of the physical channel or communication protocols used. For example, a wireless link between a temporary telescope site and the data processing facility 110 may be used. The Internet is particularly suitable, although wireless cell phone and satellite phone networks and other proprietary networks may also be used. Moreover, combination of network types may be employed. The data processing facility 110 may include a computer such as a workstation or the like with components for executing software, including a processor for executing software instructions and a memory for storing the instructions.

The different user interfaces (U1, U2, U3) may communicate with one another to share image data and other information. This may be particularly useful in a classroom or other educational setting, for example, where the instructor can guide students through different functions of the interface. In one approach, the students' displays mirror the instructor's display. These functionalities can be achieved using known techniques, such as broadcasting or multicasting. In a classroom or campus environment, the user interfaces may communicate via local area network (LAN), for instance.

The user interface, which may be generated on a display of a personal computer running appropriate software, allows a user and the data processing facility 110 to communicate with one another. The software may be loaded to the user's computers locally from a storage medium such as a CD-ROM reader, and/or downloaded from the data processing facility 110 or other remote location. In particular, in a web-based embodiment, the users may run browser software on their computers and connect to a web site that enables them to download software. A billing and accounting module 105 may implement various business models, e.g., to charge a fee to the users for downloading the software and/or for using the telescope service. The software may execute locally at the user's computer and/or at the data processing facility 110 to provide a software application that allows the user to access, and obtain images from, a network of telescopes. Example graphical user interfaces that may be provided using such an application are discussed further below in connection with FIGS. 5-7. The user interface may run on any type of computing device, including a desktop or laptop computer, as well as a more portable device such as a personal digital assistant.

Figure 2:
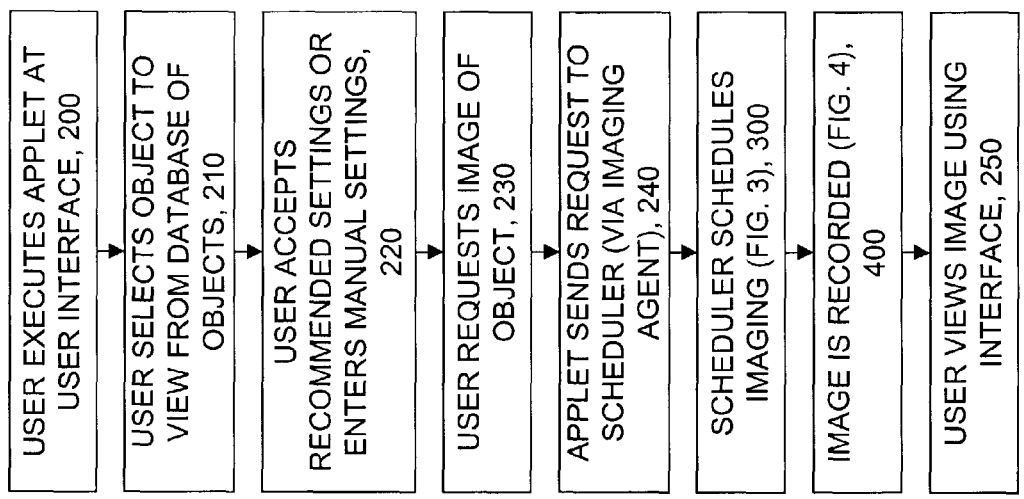
FIG. 2 illustrates a method for accessing telescopes.

The data processing facility 110 may execute software instructions to provide an imaging agent 120, discussed further in connection with FIG. 2, which is software for communicating with the user interfaces. The data processing facility 110 may further include a data source such as an object database 125 for storing data regarding various astronomical (e.g., celestial) objects, such as planets, stars, nebulas, meteors, comets and so forth. Note that the databases at the data processing facility 110 may be combined with one another. Other data that may be provided by the data source includes the magnitude or brightness of the objects, a thumbnail image of the objects, a brief or detailed text description of the objects, links to related information on the web and recommended settings for viewing the object, including telescope position settings, e.g., Right Ascension (RA) and Declination (Dec), or Elevation and Azimuth, exposure settings, filter settings and tracking mode settings. These data may be obtained from known astronomy data sources and uploaded by an operator of the data processing facility 110, retrieved from a local storage medium and/or retrieved from remote data sources such as data sources 198. Data in the object database 125 may also be obtained from local information, such as weather and telescope availability, provided by the observatories. Alternatively, or additionally, the object database 125 may be provided at the users' computers and/or at the observatories.

A scheduler 130, which may be implemented by software running at the data processing facility 110, and which may access a local and/or remote database or other data source that stores information associated with the telescopes for use in the selection process, communicates with the user interfaces and the observatories to schedule times for capturing image data of specified objects based on user requests. The database(s) may store information identifying the telescopes, the celestial objects that a respective telescope can suitably view and one or more times when a respective telescope can be used to suitably view a respective celestial body. This information maybe stored in an associated manner using known database techniques. A simplified example format for a telescope T1 and two objects O1 and O2 is as follows:

| celestial object | Telescope | Viewing Time/Date |
| --- | --- | --- |
| O1 | T1 | 1:00 a.m.-5:00 a.m./today. |
| O1 | T1 | 1:05 a.m.-5:05 a.m./tomorrow. |
| O2 | T1 | 2:00 a.m.-6:00 a.m./today. |
| O2 | T1 | 2:05 a.m.-6:05 a.m./today. |

Also, the database(s) can store, in an associated manner, quality or desirability information related to the telescope. A simplified example format is as follows for telescopes T1, T2 and T3 and quality levels Q1 and Q2.

| Telescope | Quality |
| --- | --- |
| T1 | Q1 |
| T2 | Q1 |
| T3 | Q2 |

Alternatively, or additionally, the software for implementing the scheduler may run at the users' computers and/or the observatories. Personnel at the observatory sites may inform the scheduler 130, discussed further in connection with FIG. 3, when the site is not available, e.g., due to maintenance or other factors.

A weather module 135 may be implemented by software executing at the data processing facility 110 to maintain and/or access a data source having information regarding current and forecasted weather conditions associated with the observatories, including cloud cover, visibility, temperature and the like. The weather module may employ one or more databases that store, in an associated manner, weather information related to the telescopes and the identity of the telescopes. A simplified example format for a telescope T1 is as follows. The "go" or "no go" status indicates whether or not the weather is acceptable for imaging an object.

| Telescope | Time/Date | Weather | Status |
|---|---|---|---|
| T1 | 10:00 p.m.-2:00 a.m./today | clear, 50 deg. F. | go |
| T1 | 2:00 a.m.-6:00 a.m./today | clear, 45 deg. F. | go |
| T1 | 10:00 p.m.-2:00 a.m./tomorrow | cloudy, 55 deg. F. | no go |

Various data sources may be used to obtain weather data, including personnel at the observatory sites who can provide current information regarding cloud cover or visibility for any region of the sky. This information can be manually entered at a workstation and made available to the weather module 135 using known computer network communication techniques. For example, the weather module 135 may periodically query the workstation at the observatory to determine if new weather data has been entered. Or, the workstation can communicate updated weather data to the weather module 135 on its own initiative. Furthermore, weather data such as visibility may be obtained automatically from one or more cameras, such as CCD cameras, at the observatory sites that photograph or otherwise obtain images of the sky at regular intervals. Recognition software may be used to compare the images obtained from the camera with known images from a reference library that were taken under clear sky conditions to determine if the sky is currently clear. A computer at the observatory running the recognition software can then set a status flag or signal indicating whether the weather conditions are currently acceptable for using the one or more telescopes at the observatory.

As indicated, the weather module 135 can periodically poll the observatories to determine their availability status based on the current and forecast weather. Or, the weather module 135 can poll specific observatories as needed when those observatories have been selected as being appropriate for handling current object viewing requests. In a further possibility, the weather module 135 may obtain weather data from a networked data source 198 such as a governmental or corporate weather data service. These services may provide specific regional forecasting, also known as microcasting, which provides localized weather reporting for current and forecast conditions. This is particularly useful in determining whether the weather at a telescope site is acceptable for obtaining image data.

A central data store 140 may be used to store image data that it receives from the local data stores 185 of the observatories. Users can retrieve the image data from the central data store 140 and view it on their user interfaces. Optionally, the image data may be retrieved by the users directly from the local data stores 185 at the observatories, or otherwise communicated to the users from the central data store or the local data store, e.g., via e-mail. It is also possible for a hardcopy printout of the image to be mailed to the user. Although various different approaches are viable, providing the image data to the users via the central data store 140 rather than directly from the observatories can provide benefits such as centralized control by the service provider, faster access and improved availability.

The data processing facility 110 may be implemented using known computer hardware, networking and software techniques to achieve the functionality described herein. Generally, the data processing facility 100 accesses one or more data sources to obtain the necessary information for assisting a user in obtaining an image of an object from a suitable telescope. This may be achieved using any known systems and techniques for storing, accessing and manipulating data, whether local to, or remote from, the data processing facility 110.

The observatory O1 typically is a permanent structure where one or more telescopes 160 and other monitoring and control equipment are housed. However, the term is meant to include temporary telescope set-ups as may be provided in a desired location, such as a desert, mountainous area or other location. There is no need for the telescope to be housed in a structure. For such temporary set-ups, a wireless communication link may be used to communicate with the data processing facility 110 and/or users as needed. Such a link may be established using satellite or other wireless transmitting and receiving equipment, for instance. Additionally, the telescope itself may be of any design type, including optical and radio telescopes, that provide an image of interest. The telescope 160 has an associated imaging device 165 such as a CCD camera that obtains electronic images from the telescope's field of view. Such cameras and equipment for using them with telescopes are well known in the art.

The batch job executer 170 may be used to maintain a request queue for one or more telescopes. In one approach, before the scheduled times, the scheduler 130 sends multiple user requests to use the telescope 160 to obtain image data. The requests are queued by the batch job executer 170 until the scheduled time, when the batch job executer 170 sends the corresponding request to an observatory station controller (OSC) 175. The batch job executer 170 receives job status information and an image file back from the observatory station controller 175, and forwards the image file to the local data store 185. The file may be any type of file for storing image data.

The OSC 175 may control local telescope functions, including, for example, opening and closing an observatory door, controlling telescope focus and switching a filter wheel. The OSC 175 also may communicate with a drive controller 180 of the telescope by providing it with "go to" position commands, tracking mode data, and slew speed selection data. The drive controller 180 may be a closed-loop servo controller. Moreover, the OSC 175 may implement telescope settings selected by the user via the user interface, and/or default settings, as discussed further in connection with FIG. 5. These settings may be communicated to the OSC 175 by the scheduler 130 in an imaging request message. An identifier of the celestial object that is being imaged may be communicated to the OSC 175, such that the OSC determines settings from a look-up table or the like based on the identifier.

Note that the system can accommodate any number of additional observatories, such as observatories O2 and O3, that may operate as discussed in connection with observatory O1, as well as any number of users that may operate as discussed in connection with the user U1.

FIG. 2 illustrates a method for accessing telescopes. Refer also to the user interface 500 of FIG. 5. At block 200, the user initiates the process by running software such as an applet at the user interface. At block 210, the user selects a celestial object to view from a database of available objects. In one possibility, the user may use a mouse or other pointing device to highlight a particular object, then click on a "select object" button. In the interface 500, there are five objects available, although a more comprehensive menu of hundreds or even thousands of objects is readily obtainable from known data sources. The interface 500 may allow the user to obtain additional information about the objects, such as a textual description, links to related information on the web and so forth. At block 220, the user accepts recommended settings for viewing the object or enters manual settings, or a combination of recommended/default and manual settings may be used. These settings may include, e.g., Right Ascension (RA) and Declination (Dec), or Elevation and Azimuth, exposure settings, filter settings and tracking mode settings. At block 230, the user requests an image of the selected object. Essentially, the user has located a celestial object of interest and desires to obtain an image of the object from a telescope that may be located on the other side of the globe. Note that multiple imaging requests by one user may also be handled at the same time. The object of interest may be selected by the novice astronomer based simply on its appearance, name or recent media coverage, or by the professional or more experienced amateur astronomer based on specific research objectives. For example, the professional astronomer may know that it is a particularly good time of year to obtain a clear image of a particular object, or that an unusual occurrence is about to occur, such as an interaction of two objects. The user interface may similarly provide information to assist the novice astronomer by suggesting particular celestial objects that may be desirable to view at the time. In particular, the user interface may connect to a web site that is maintained by a service provider to obtain current information about desirable viewing events. The web site may further provide a calendar of future viewing events to allow the user to plan ahead and to request an image, even months in advance. Moreover, by submitting an early request, the user may be rewarded, e.g., by a more desirable scheduled imaging period and/or preferred telescope.

At block 240, the applet running at the user interface sends the user's request to the scheduler 130 via the imaging agent 120. At block 300, the scheduler 130 schedules the imaging of the object, as discussed further in connection with FIG. 3. At the scheduled time, the image is recorded (block 400), as discussed further in connection with FIG. 4, and at block 250, the user is finally able to view the image using the interface.

Figure 3:
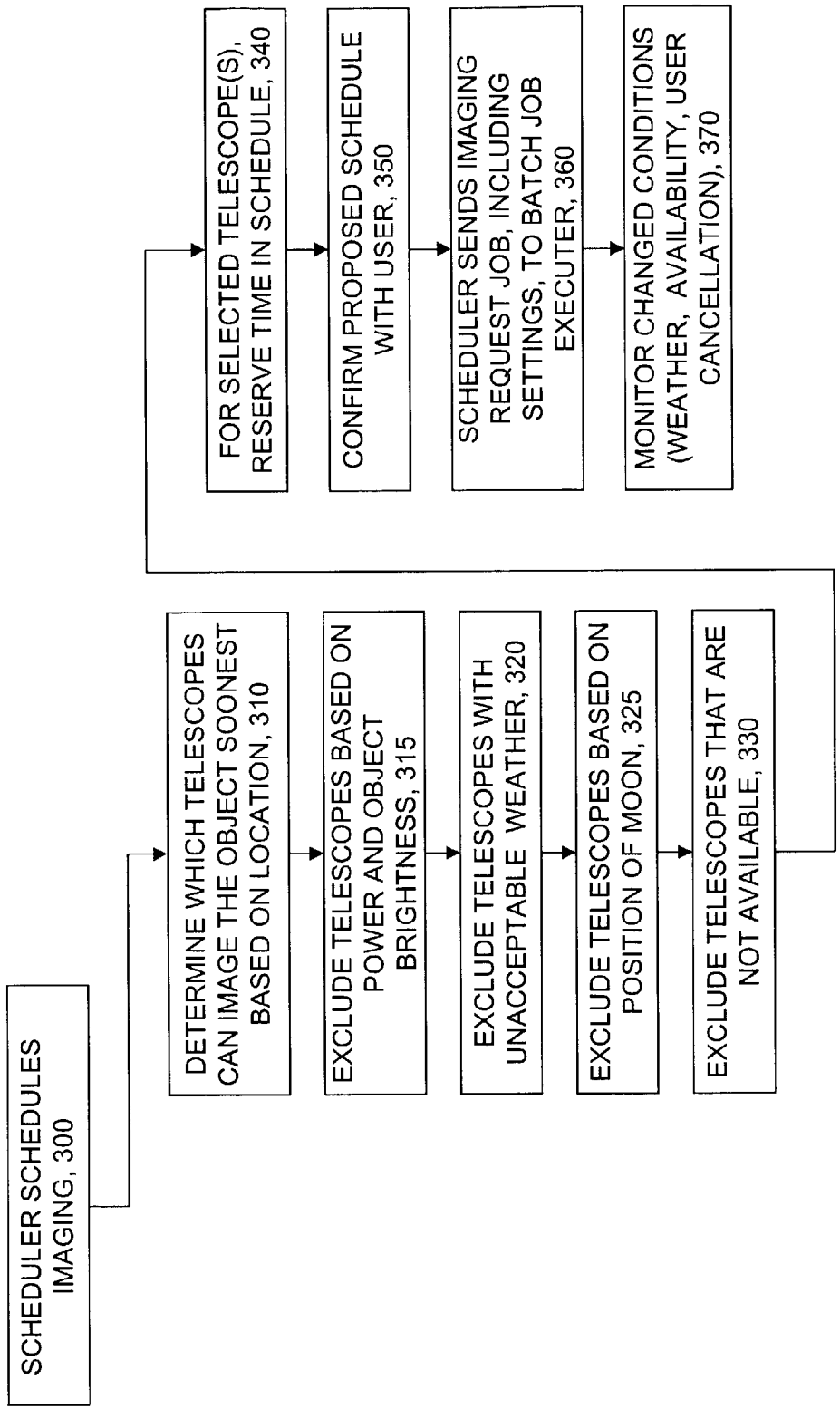
FIG. 3 illustrates a method for scheduling the imaging of a selected object.

FIG. 3 illustrates a method for scheduling the imaging of a selected object. Note that the steps shown here and elsewhere are examples only and need not occur in discrete steps or in the order shown. Generally, the scheduler 130 may access one or more data sources such as a database of information relating to the telescopes, including telescope type, availability, power, quality, configuration, location, weather conditions and altitude. For example, the scheduler may execute software to determine one or more suitable telescopes that can obtain an image of the user-designated celestial object (block 310), e.g., based on a location of the telescope relative to the object. In one possible approach, this can be achieved by accessing a data source that provides a rise and set time of the object, and a midpoint time between the rise and set times, when the object is at its zenith or highest point in the sky. Or, if not provided in the data source, the zenith may be calculated as needed from the rise and set times. A suitable telescope for imaging the object is one that is located sufficiently closest to the point in the night sky where the object is at its zenith. For example, using known calculations and software, a distance between a location on the earth, expressed, e.g., in terms of a longitude and latitude, and the zenith location can be determined. The telescope that is closest to the zenith location may then be selected as the preferred or best-situated telescope to image the object. Moreover, a number of telescopes may be sorted according to their proximity to the object for use in the selection process. Resources for obtaining software for making such calculations are widely available from universities, government agencies and astronomy groups. A simplified psuedo-code for the above is as follows, where the distance calculations are made using vectors O, T1 and T2 that extend from the origin of any coordinate system, such as spherical or Cartesian, to the object, telescope 1 and telescope 2, respectively. "abs" denotes absolute value.

---
obtain rise and set time of object O→ 2:00 a.m. rise time, 6:00 a.m. set time
determine zenith→4:00 a.m.
distance between object O at zenith and telescope T1→abs(O-T1)
distance between object O at zenith and telescope T2→abs(O-T2)
if abs(O-T1) < abs(O-T2), select T1
    else select T2

---

At block 315, a determination is made as to whether the telescopes that are suitable for imaging the object based on their location are also suitable based on their power and the brightness of the object, e.g., as indicated by a brightness measure such as virtual magnitude. An object that is relatively dim should be imaged by a telescope that is relatively powerful. Of the telescopes that are still tentative candidates, those having unacceptable weather are excluded (block 320). Weather data may be accessed as discussed above from available data sources. Additionally, at block 325, a telescope may be excluded based on the relative position of the moon to the object from the telescope's perspective since the light from the moon will make it harder to image an object such as a star. The brightness and/or fullness of the moon may also be considered in this decision. Moreover, at block 330, telescopes that are not available sufficiently soon, e.g., due to scheduled periods allotted to other astronomers, or downtime of the telescopes for repairs or the like, are excluded from consideration.

Note that other various filtering criteria and tradeoffs may be applied to the selection process. For example, a higher-powered telescope that is further from the object at its zenith than a lower power telescope may be selected. Various metrics may be developed for use in such tradeoffs. Moreover, the selection process may be adjusted based on a fee paid by the user, such that a more desirable telescope or scheduled imaging time is provided to a user that pays a greater fee.

For the selected telescopes, at block 340, one or more time periods are reserved in a proposed schedule for the user. At block 350, the proposed schedule is presented to the user to be confirmed, as discussed further in connection with FIG. 6, by communicating the appropriate information to the user interface. Once the schedule is confirmed, at block 360, the scheduler sends an imaging request job or message to the batch job executer 170. This message may include information such as the settings that are to be applied to the telescope when imaging the selected object. Default settings may also be applied at the telescope site. At block 370, changed conditions are monitored to determine whether a cancellation of the scheduled imaging time is warranted, e.g., due to poor weather, lack of availability, or a user-initiated cancellation.

Figure 4:
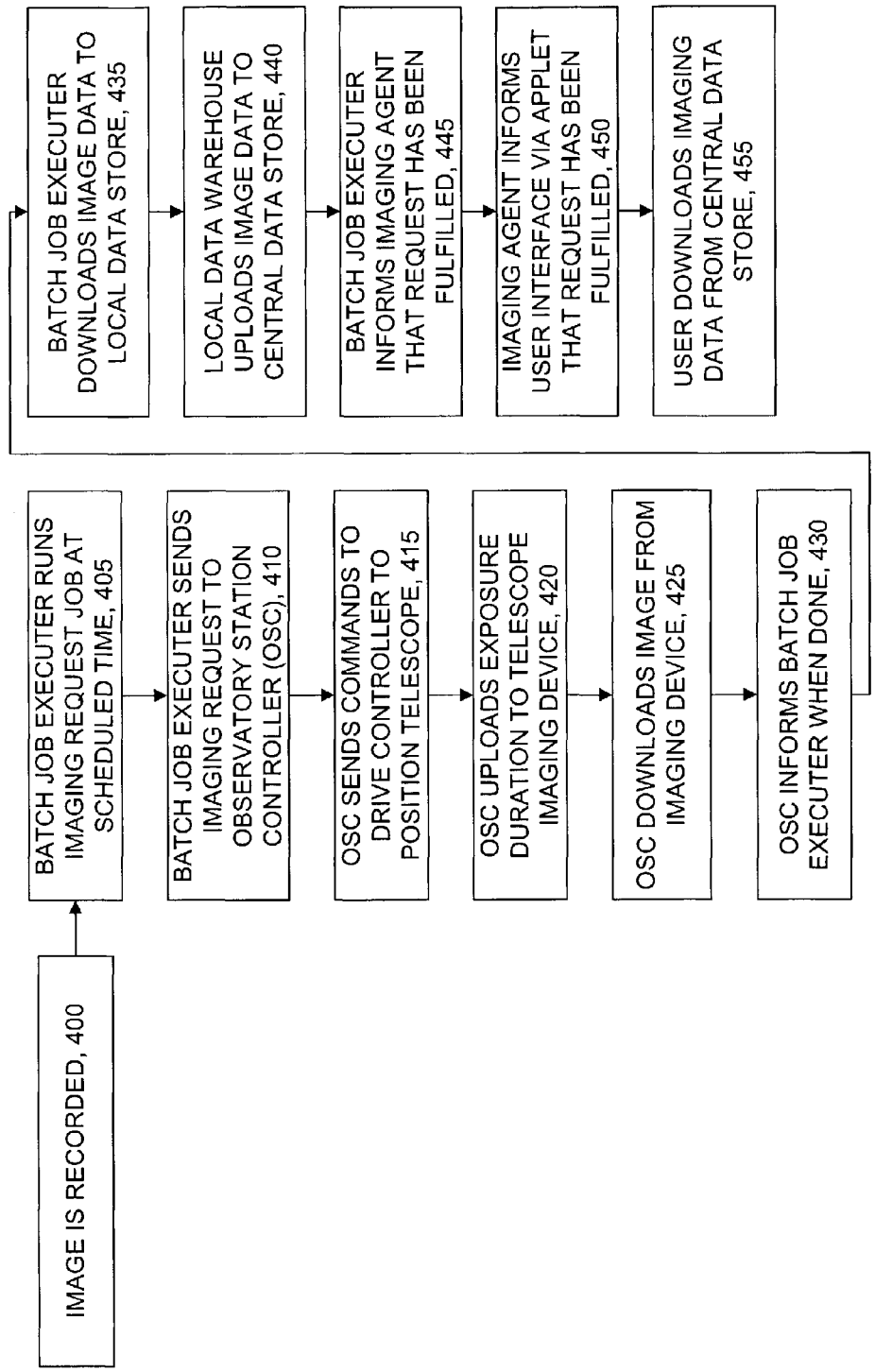
FIG. 4 illustrates a method for recording an image of a selected object.

FIG. 4 illustrates a method for recording an image of a selected object (block 400). The batch job executer runs the imaging request job received from the scheduler at the scheduled time (block 405), and sends an imaging request to the OSC (block 410). In response, the OSC sends commands to drive a controller to position the telescope as needed to image the object (block 415). Moreover, the OSC may upload settings to the imaging device such as exposure duration, filter setting or the like (block 420). Once the telescope has been configured and moved to the appropriate position, the imaging device records an image during an exposure time, which may be several minutes, and downloaded by the OSC (block 425). The OSC also informs the batch job executer when it is done, so the executer can begin to process the next imaging request (block 430).

Figure 7:
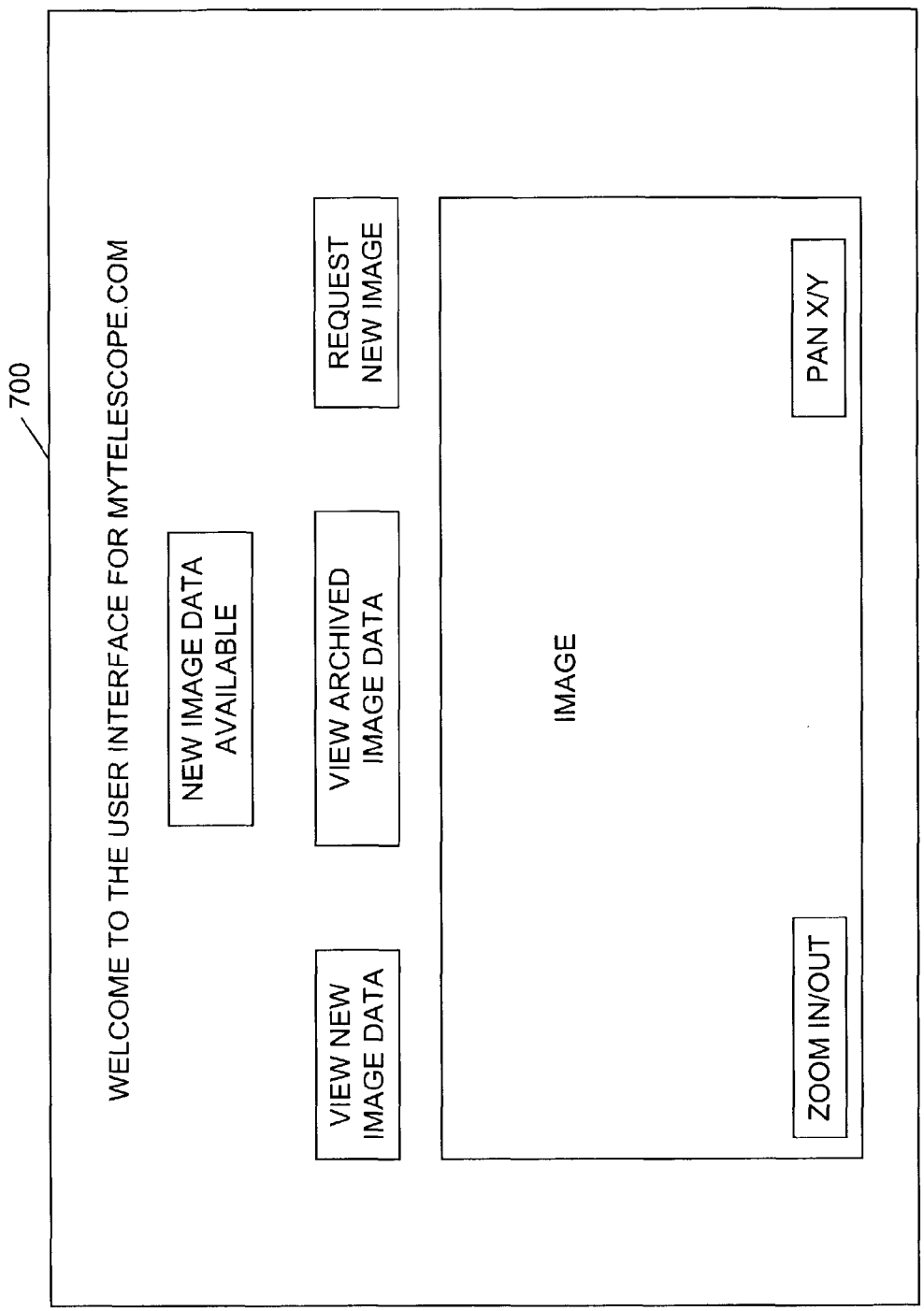
FIG. 7 illustrates an example user interface for viewing image data.

The batch job executer may download the image data to a local data store (block 435), after which the data is uploaded to a central data store (block 440), the imaging agent is informed by the batch job executer that the imaging request has been fulfilled (block 445), and the imaging agent informs the user interface via the applet that the request has been fulfilled (block 450), for example, using the message "new image data available" in the interface 700 of FIG. 7. This enables the user to download the image data from the central data store (block 455) and view it using the interface 700. The user may be notified that the image is available when he or she connects to a web site that offers the on-line, e.g., computer network-accessible, service. Also, e-mail may be sent to the user informing him or her that the image data is available.

Figure 5:
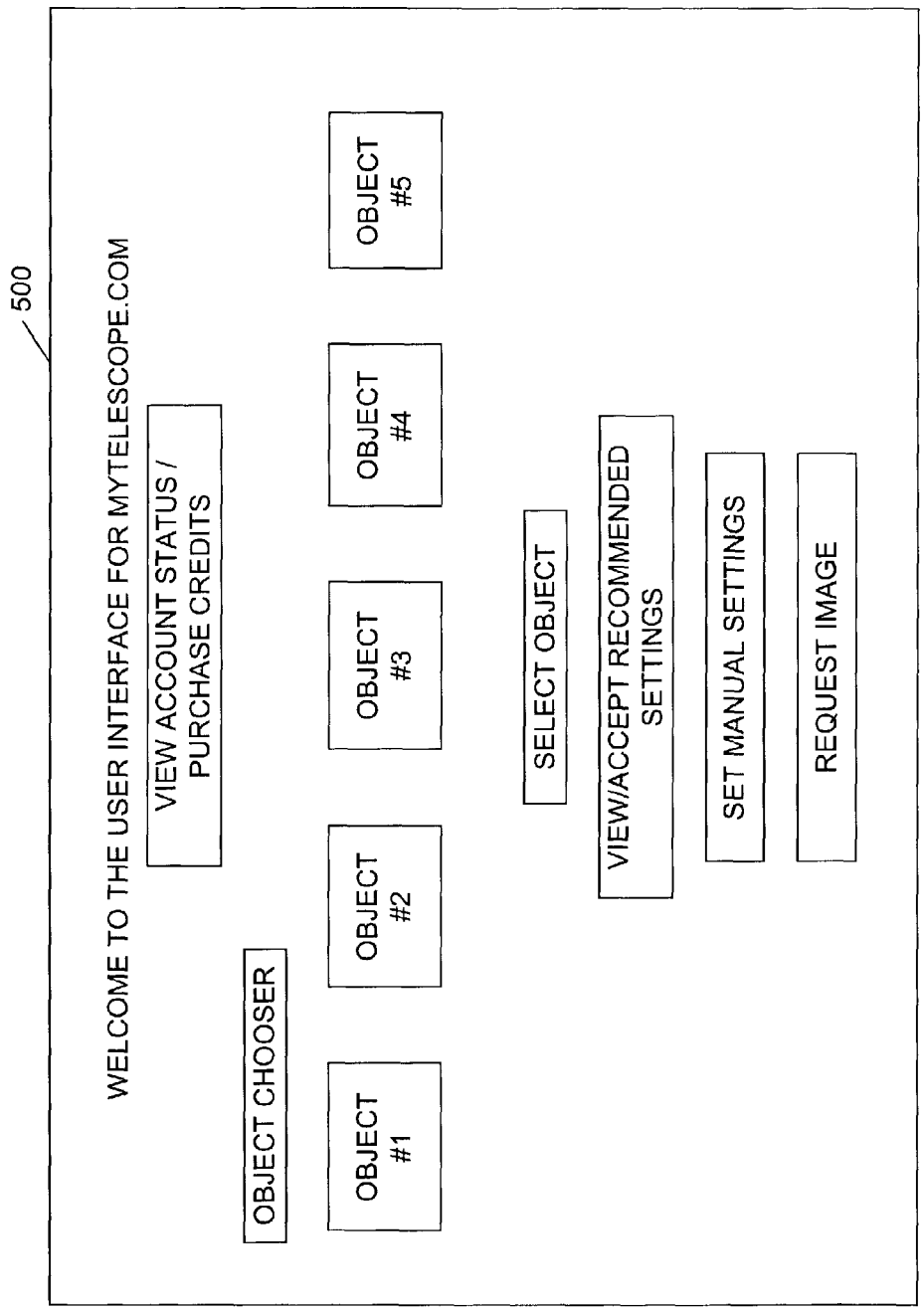
FIG. 5 illustrates an example user interface for selecting an object to be imaged.

FIG. 5 illustrates an example user interface 500 for selecting an object to be imaged. The interface 500 may present an "object chooser" function that, when selected, causes the display of a number of different celestial objects, e.g., objects #1-#5, from a catalog of objects. Moreover, the objects may be arranged according to type, e.g.: sun, moon, planets and their moons, constellations, stars and deep sky objects. Furthermore, specific objects may be featured by the service provider based on specific interests of the user, e.g., as determined by tracking the user's previous activities or via an on-line or off-line survey. Additionally, a drop down list or the like may enable the user to sort the object types according to Name, Right Ascension (RA), Declination (Dec), Virtual Magnitude (V Mag), and Zenith Distance.

Using other functions that are presented on the interface 500, the user may select an object of interest, view the recommended settings for viewing the object and, if desired, accept the settings, set manual settings in place of, or in conjunction with, the recommended settings and request an image of the object. The user may also select whether the proximity of the moon to the object should be used to exclude certain telescopes and/or time periods from consideration. As discussed previously, the data for generating the interface 500 and the other interfaces may be stored locally to, and/or remotely from, the computing devices on which the interfaces are generated. For instance, in a web-based approach, some of the information for generating the interfaces may be stored at a web server, e.g., at the data processing facility 110 or other location, and communicated to the devices using known computer network communication techniques.

FIG. 6 illustrates an example user interface 600 of a proposed schedule for accessing one or more telescopes. Once the user has requested an image of a particular celestial object, and one or more suitable telescopes are identified by accessing various data sources, a proposed schedule is presented to the user. For example, in this case, a telescope #1 is available at two different time periods, while a telescope #2 is available at one time period. The user has the option of selecting one of the time periods by indicating his or her preference in a checkbox or the like in the interface 600 and clicking on a "submit" button. Moreover, the time may be expressed as an estimated time of day. In fact, the required exposure time and telescope configuration time can vary for the different objects in each imaging request job, so the telescope may be ready to image a next object before the originally scheduled time. Generally, the image request jobs may be processed in the batch order, one after another. If desired, provisions may be made so that an imaging job occurs at an exact time.

The user may be given more scheduling choices based on payment of a larger fee to the service provider, while a user paying a relatively small fee is given more limited choices or no choice. Also, when a choice of schedules is provided, the user may be required to respond within a given amount of time. Moreover, again depending on the fee paid, the scheduled time periods may be held for the preferred user for a longer time compared to a lower paying user. Additionally, the scheduled time periods that are offered to a first user may not be offered to other users until they are rejected by the first user, or, alternatively, common scheduled time periods for the same telescope may be offered to multiple users at once, in which case the user that is first to accept a time period is granted that period, and the schedules of the other users may be updated to delete the accepted time period from the available choices.

FIG. 7 illustrates an example user interface 700 for viewing image data. As discussed, the interface 700 allows a user to view image data that has been obtained by a telescope and made available, e.g., by the data processing facility 110. The interface 700 informs the user that the new image data is available, and enables the user to view it, e.g., by downloading it from the central data store. Buttons or other elements may be provided in the interface 700 to enable the user to manipulate the image, e.g., by zooming in or out, panning, adding notes and so forth. Moreover, other information regarding the image may be provided with the image data, e.g., as meta data, to inform the user of the settings, the telescope configuration and type, the weather at the time of the imaging and so forth. The interface 700 may further allow the user to view archived image data, e.g., data that has been previously viewed, and to request a new image, e.g., by displaying the interface 500. The archived data may be arranged by the date on which it was obtained or by other criteria, such as object name. Moreover, different users, such as members of an astronomy club, or students in an astronomy class, may be enabled to share files of image data by providing appropriate permissions/security and communication mechanisms.

Figure 8:
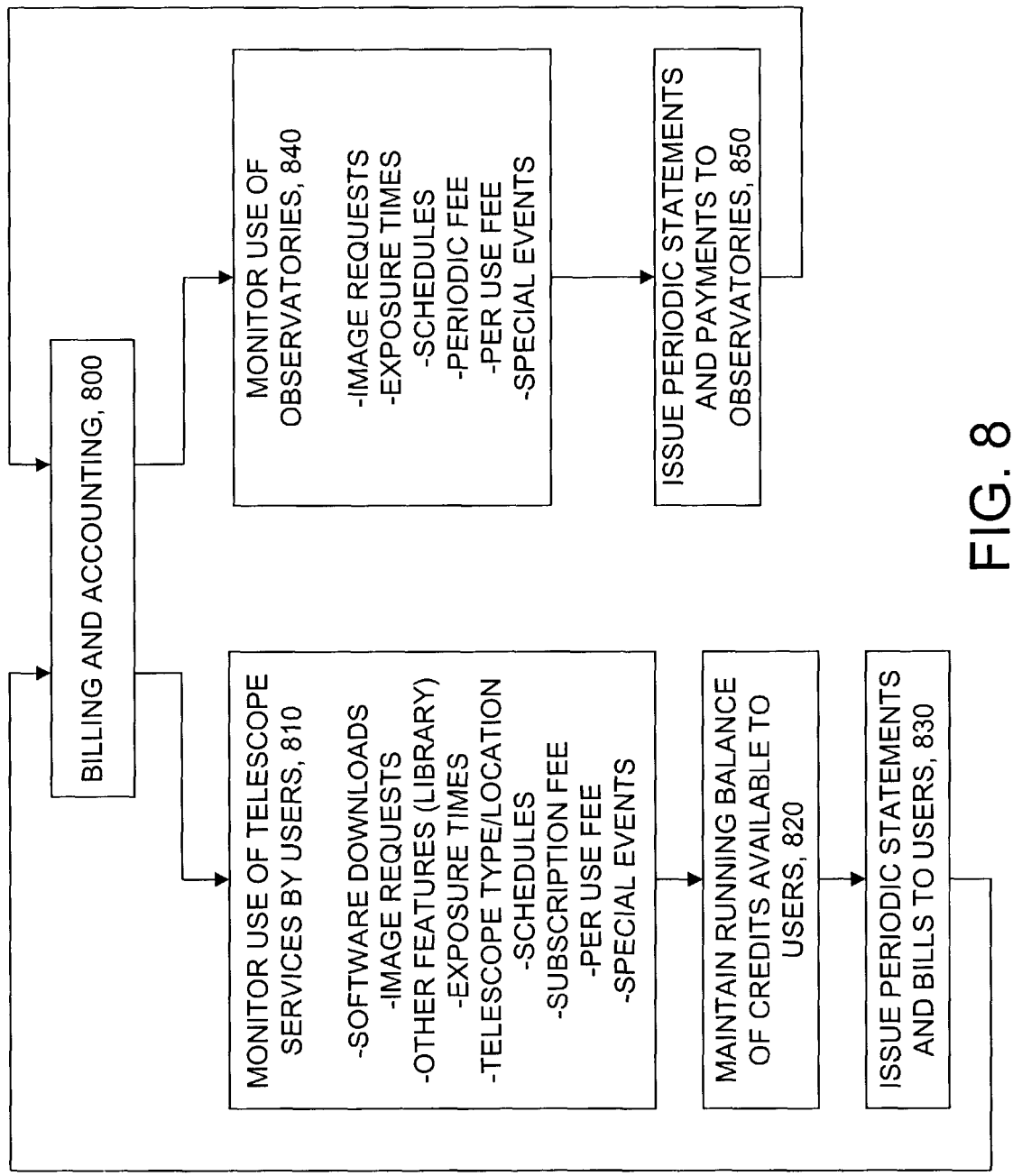
FIG. 8 illustrates a billing and accounting method for a telescope service.

FIG. 8 illustrates a method for billing users for accessing a telescope service. As discussed, various marketing approaches may be implemented by a service provider to charge users a fee for using the telescope access service. Generally, any desired billing and accounting functions can be implemented by the billing and accounting module 105, which may be configured using known software and/or hardware techniques. In one possible approach, the user may purchase and redeems credits via an interface, such as the interface 500 of FIG. 5. For example, the button "view account status/purchase credits" may be selected to cause a display of the number of credits available, and to allow the user to purchase additional credits on-line using a credit card, an online payment service such as Paypal® or the like. Essentially any type of known billing system may be used. For instance, the user may receive a bill via e-mail or conventional mail. The credits may be packaged such that the user receives a discount on the price per credit when buying a large group of credits. The credits are used or cashed in when the users avail themselves of various features of the service. For example, credits may be consumed in proportion to the shutter/exposure time used in imaging a selected object, so that a user is charged more credits for a longer exposure.

Also, credits may be consumed according to the desirability, e.g., quality, of the telescope used based on its power, location or other factors, such that a more desirable telescope costs more credits to use. A ranking system may be developed for the telescopes in this regard. For example, telescopes may be assigned to a top tier, medium tier, or base tier according to their desirability. Credits may also be consumed based on the scheduling of an image, such that an earlier time period can be scheduled for additional credits. Moreover, for users that are not in rush to receive an image, a lower-priced "anytime picture" may be provided that is scheduled in time periods that would otherwise go unused. Additionally, a discount may be offered to users that request an image well in advance, similar to "early booking" incentives offered in the travel industry. Various penalties may be assessed for canceling an image request after it is made.

The user may be charged for the services accessed using a shopping cart model or other e-commerce technique. Another possibility is to charge the user a monthly or other periodic fee instead of a per-use fee that provides a given less of access to the service, e.g., $10 a month to obtain two images. In any case, a fee is assessed to the user for use of the service, whether by credits, per-use fees, monthly subscription fees or other approach. The billing module 105 may also maintain a record of the telescopes and observatories that have been used to obtain images and provide some type of compensation to them. The observatories may have an accounting function 188 that also maintains data regarding their usage and participation in the service. For example, the accounting function 188 may maintain data indicating each time a batch image request job is executed, the exposure time, and so forth. These functionalities can be achieved using conventional software and hardware techniques. The service provider or other entity that controls the data processing facility 110 and billing module 105 may enter into agreements with the entities that control the observatories to pay them a certain amount based on each use of their telescopes, a flat monthly fee, or some other arrangement. Additionally, the service provider may promote the user of specific observatories, e.g., by providing advertising on the user interfaces and giving priority to them when selecting a telescope to view an image. Such agreements can ensure that the observatories are fairly compensated for their expenses and encourage their cooperation in the system. The entities controlling the telescopes may become profitable enterprises themselves. The service provider and entities controlling the telescopes may also be commonly owned or otherwise aligned.

The process of FIG. 8 provides a general illustration of a billing and accounting process, which begins at block 800. The billing and accounting activities are conducted for individual users and for individual observatories, or groups of related observatories, such as those that are commonly controlled by a university or the like. For the individual users, at block 810, the use of the telescope services by an exemplary one of users is monitored and recorded. The monitored activities may include software downloads, image requests, accessing of other features such as a library of information, exposure times for the requested images, the telescope type and location and the scheduled times for the images, e.g., such that a higher charge is assessed for an earlier scheduled time slot. Additionally, the user may be billed based on a subscription fee, such as a monthly fee, and/or a per use fee. Further fees may be assessed for special events, such as obtaining an image of a rare celestial event or participating in an on-line chat with an astronomer or other person. At block 820, a running balance is maintained for the user based on the credits purchased and redeemed. At block 830, a periodic statement and bill is issued to the user, e.g., via e-mail or mail, such as when the user is on a monthly subscription plan. The billing and accounting for each of the users may be handled as indicated.

At block 840, the observatories are monitored to maintain a record of their activities as they relate to the telescope service. For example, this may include monitoring the number of image requests processed by the observatory, the exposure times, the total time consumed in processing an image request, including the time to position and configure the telescope, the scheduled times at which the images were obtained, and any periodic or per use fees that are due the owners or operators of the observatory as compensation for their participation in the telescope service. Additional compensation may be paid for participation in special events. At bock 850, periodic statements and payments are provided to the observatories based on the usage of the observatory and other agreed-upon provisions. Typically, an entity that controls an observatory may engage in an agreement with an entity that operates the telescope service to set the fees that will be paid.

Accordingly, it can be seen that the present invention provides a system and method for enabling a user to obtain, view and store image data of a selected celestial object from a network of available telescopes using a computer-generated user interface. Information is accessed regarding the telescopes from data sources such as databases and live data feeds to automatically select one or more telescopes that are suitable for imaging the object, e.g., according to factors such as telescope type, power and configuration, location, weather conditions and altitude. The user may select a particular one of the suitable telescopes from a schedule of available telescopes and imaging times that is presented via the interface. At the scheduled imaging time, an image is recorded of the celestial object using an imaging device such as a CCD camera associated with the selected telescope and communicated to a central data store. The user can then access a web site associated with the data store to view the image. The user may be charged for the service based on factors such as exposure time, type of telescope and the like.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for selecting a telescope out of a plurality of telescopes, comprising:

determining, using software instructions at a data processing facility that is remote from a user, from which one or more telescopes, out of the plurality of telescopes, a celestial object of interest is viewable;

determining, using software instructions at the data processing facility, one or more times at which the celestial object is viewable on each of the one or more determined telescopes;

accessing, at the remote data processing facility, at least one source of information relating to the one or more determined telescopes including a distance to the one or more determined telescopes when the celestial object of interest is at its zenith; and selecting, using the software instructions at the data processing facility and based at least on the shortest distance to the celestial object of interest at its zenith, a telescope out of the one or more determined telescopes and a time out of the one or more determined times at which the selected telescope can obtain an image of the celestial object.

2. The method of claim 1, wherein moon proximity to the celestial object of interest is used to exclude one of more of the one or more determined telescopes from being a selected telescope.

3. A system for selecting a telescope out of a plurality of telescopes, comprising:
   a data processing facility that is remote from a user, the data processing facility having one or more computer processors executing software instructions that perform the steps of:
      determining from which one or more telescopes, out of the plurality of telescopes, a celestial object of interest is viewable in response to receiving user input selecting the celestial object of interest;
      determining one or more times at which the celestial object is viewable on each of the one or more determined telescopes;
      accessing, at the data processing facility, at least one source of information relating to the one or more determined telescopes including a distance to the one or more determined telescopes when the celestial object of interest is at its zenith; and
      selecting, based at least on the shortest distance to the celestial object of interest at its zenith, a telescope out of the one or more determined telescopes and a time out of the one or more determined times at which the selected telescope can obtain an image of the celestial object.

4. The system of claim 3, wherein moon proximity to the celestial object of interest is used to exclude one of more of the one or more determined telescopes from being a selected telescope.

5. A method for providing access to a selected telescope out of a plurality of telescopes, comprising:
   determining, using software instructions at a data processing facility that is remote from a user, from which one or more telescopes, out of the plurality of telescopes, a celestial object of interest is viewable in response to receiving user input selecting the celestial object of interest;
   determining, using software instructions at the data processing facility, one or more times at which the celestial object is viewable on each of the one or more determined telescopes;
   accessing, at the remote data processing facility, at least one source of information relating to the one or more determined telescopes including a rise and set time of the celestial object of interest with respect to a location of each of the one or more determined telescope;
   selecting, using the software instructions at the data processing facility and based at least on the rise and set time of the celestial object of interest with respect to the location of each of the one or more determined telescope, a telescope out of the one or more determined telescopes and a time out of the one or more determined times at which the selected telescope can suitably view the selected celestial object; and
   communicating with the selected telescope to obtain an image of the selected celestial object.

6. The method of claim 5, wherein moon proximity to the celestial object of interest is used to exclude one of more of the one or more determined telescopes from being a selected telescope.

7. A system for providing access to a selected telescope out of a plurality of telescopes, comprising:
   a data processing facility that is remote from a user, the data processing facility having one or more computer processors executing software instructions that perform the steps of:
      determining from which one or more telescopes, out of the plurality of telescopes, a celestial object of interest is viewable in response to receiving user input selecting the celestial object of interest;
      determining one or more times at which the celestial object is viewable on each of the one or more determined telescopes;
      accessing, at the data processing facility, at least one data source of information relating to the one or more determined telescopes including a rise and set time of the celestial object of interest with respect to a location of each of the one or more determined telescope;
      selecting, based at least on the rise and set time of the celestial object of interest with respect to the location of each of the one or more determined telescope, a telescope out of the one or more determined telescopes and a time out of the one or more determined times at which the selected telescope can suitably view the selected celestial object; and
      communicating with the selected telescope to obtain an image of the selected celestial object.

8. The system of claim 7, wherein moon proximity to the celestial object of interest is used to exclude one of more of the one or more determined telescopes from being a selected telescope.

\* \* \* \* \*

UNITED STATES PATENT AND TRADEMARK OFFICE
CERTIFICATE OF CORRECTION

| | |
|---|---|
| PATENT NO. | : 8,275,883 B2 |
| APPLICATION NO. | : 10/267919 |
| DATED | : September 25, 2012 |
| INVENTOR(S) | : Jon Snoddy et al. |

It is certified that error appears in the above-identified patent and that said Letters Patent is hereby corrected as shown below:

In the Specifications:

Column 4, In line 31 replace "maybe" with --may be--

Column 10, In line 49 replace "redeems" with --redeem--

Signed and Sealed this
Twenty-third Day of April, 2013

Teresa Stanek Rea
*Acting Director of the United States Patent and Trademark Office*